US 8,468,573 B2

(12) United States Patent
Song et al.

(10) Patent No.: US 8,468,573 B2
(45) Date of Patent: *Jun. 18, 2013

(54) METHOD FOR REDUCING CHANNEL CHANGE TIME OF INTERNET PROTOCOL TELEVISION (IPTV) AND IPTV SERVICE PROVISION SERVER FOR IMPLEMENTING THE SAME

(75) Inventors: Hwangjun Song, Kyungsanghuk (KR);
Dai-boong Lee, Kyungsanghuk (KR);
Hyunchul Joo, Kyungsanghuk (KR)

(73) Assignee: Postech Academy-Industry Foundation, Pohang, Gyeongsangbuk-Do (KR)

( * ) Notice: Subject to any disclaimer, the term of this patent is extended or adjusted under 35 U.S.C. 154(b) by 197 days.

This patent is subject to a terminal disclaimer.

(21) Appl. No.: 13/071,261

(22) Filed: Mar. 24, 2011

(65) Prior Publication Data
US 2011/0173670 A1 Jul. 14, 2011

Related U.S. Application Data

(63) Continuation of application No. 11/830,028, filed on Jul. 30, 2007, now Pat. No. 7,954,132.

(30) Foreign Application Priority Data
Jun. 13, 2007 (KR) .................. 10-2007-0057937

(51) Int. Cl.
*H04N 7/173* (2006.01)

(52) U.S. Cl.
USPC .......................................... 725/114; 725/120

(58) Field of Classification Search
USPC ............... 348/731, 725; 375/240, 240.01, 375/240.1, 240.12, 240.13; 725/114–118, 725/120–121, 144–148
See application file for complete search history.

(56) References Cited

U.S. PATENT DOCUMENTS

| 7,562,375 B2 * | 7/2009 | Barrett et al. ................. 725/38 |
| 2005/0078757 A1 * | 4/2005 | Nohrden ................. 375/240.28 |
| 2006/0075428 A1 * | 4/2006 | Farmer et al. ................. 725/38 |
| 2007/0250890 A1 * | 10/2007 | Joshi et al. ................. 725/120 |
| 2007/0277219 A1 * | 11/2007 | Toebes et al. ................. 725/139 |
| 2007/0280298 A1 * | 12/2007 | Hearn et al. ................. 370/498 |
| 2008/0301745 A1 * | 12/2008 | Liu et al. ................. 725/110 |

* cited by examiner

*Primary Examiner* — Ngoc Vu
(74) *Attorney, Agent, or Firm* — Edwards Wildman Palmer LLP

(57) ABSTRACT

The present invention provides a method for reducing channel change time of an IPTV and an IPTV service provision server for implementing the same, which comprise: determining the type of each of individual channels to be provided to a user and the number of additional intraframes required to be inserted into video data to be provided via the channels; inserting the additional intraframes corresponding to the determined number into the video data; encoding the video data; and transmitting the encoded video data to a first router or a second router according to the determined channel type, before receiving a channel request signal from the user.

19 Claims, 12 Drawing Sheets

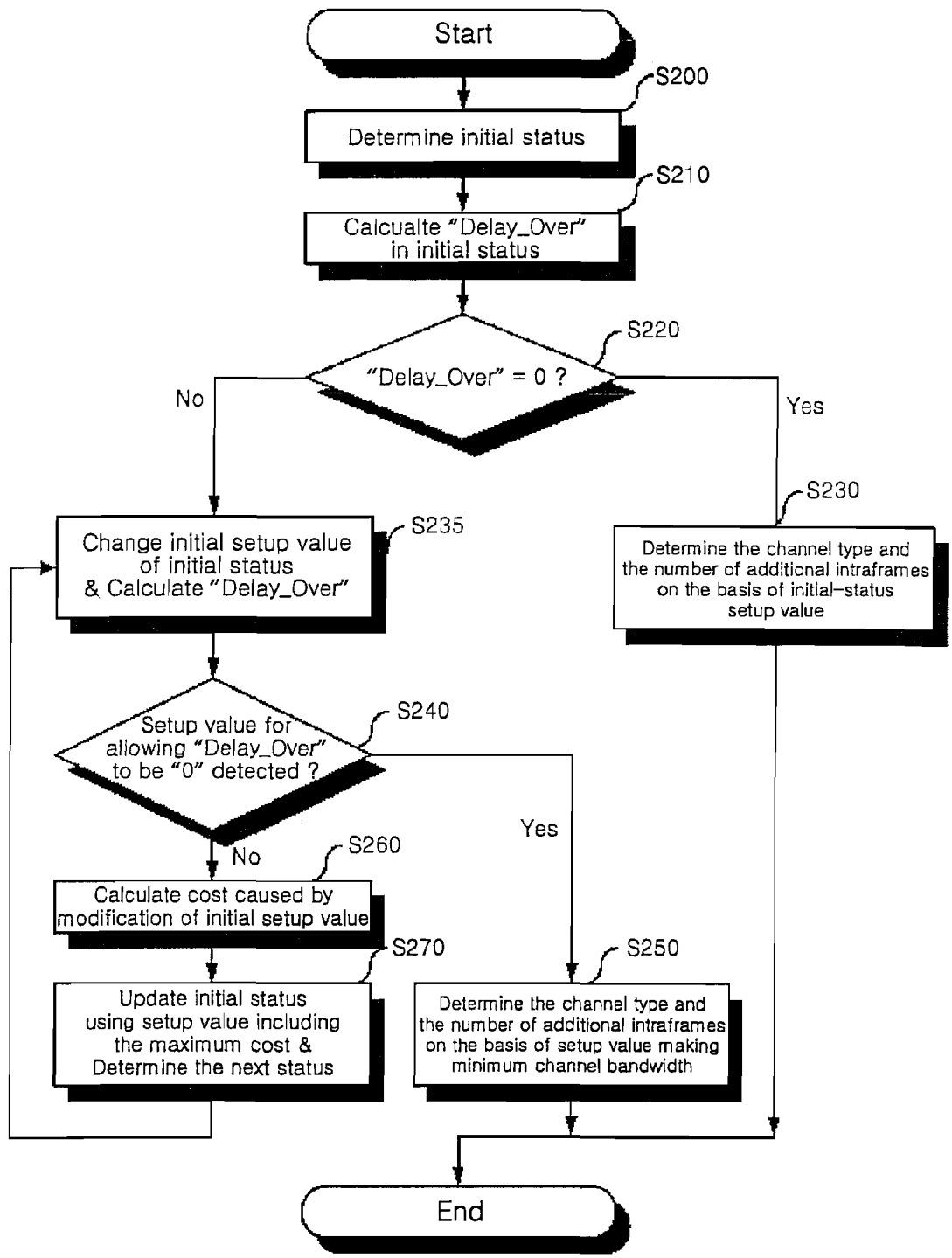

FIG. 8A

| algorithm | threshold value | 1.6 sec | | 1.5 sec | | 1.4 sec | | 1.1 sec | | 0.9 sec | | 0.7 sec | | 0.5 sec | | 0.3 sec | | 0.2 sec | |
|---|---|---|---|---|---|---|---|---|---|---|---|---|---|---|---|---|---|---|---|
| | Static channel No. | none | | none | | none | | 2 | | 2,3 | | 2,3,5 | | 2,3,4,5 | | 1,2,3,4,5 | | 1,2,3,4,5 | |
| | | channel | Intra frame | channel | Intra frame | channel | Intra frame | channel | Intra frame | channel | Intra frame | channel | Intra frame | channel | Intra frame | channel | Intra frame | channel | Intra frame |
| Viterbi algorithm | The number of additional intraframes of corresponding channel | 1 | 1 | 1 | 1 | 1 | 1 | 1 | 3 | 1 | 3 | 1 | 2 | 1 | 2 | 1 | 2 | 1 | 2 |
| | | 2 | 0 | 2 | 2 | 2 | 2 | 2 | 2 | 2 | 2 | 2 | 1 | 2 | 1 | 2 | 1 | 2 | 2 |
| | | 3 | 0 | 3 | 1 | 3 | 2 | 3 | 3 | 3 | 3 | 3 | 1 | 3 | 1 | 3 | 1 | 3 | 1 |
| | | 4 | 0 | 4 | 0 | 4 | 1 | 4 | 3 | 4 | 3 | 4 | 1 | 4 | 1 | 4 | 0 | 4 | 1 |
| | | 5 | 0 | 5 | 0 | 5 | 1 | 5 | 2 | 5 | 2 | 5 | 1 | 5 | 0 | 5 | 0 | 5 | 1 |
| Algorithm of FIG. 7 | Static channel No. | none | | 2 | | 2 | | 2 | | 2,3 | | 2,3,4 | | 2,3,4,5 | | 1,2,3,4,5 | | 1,2,3,4,5 | |
| | | channel | Intra frame | channel | Intra frame | channel | Intra frame | channel | Intra frame | channel | Intra frame | channel | Intra frame | channel | Intra frame | channel | Intra frame | channel | Intra frame |
| | The number of additional intraframes of corresponding channel | 1 | 1 | 1 | 0 | 1 | 0 | 1 | 3 | 1 | 3 | 1 | 3 | 1 | 3 | 1 | 0 | 1 | 1 |
| | | 2 | 0 | 2 | 0 | 2 | 0 | 2 | 2 | 2 | 1 | 2 | 2 | 2 | 1 | 2 | 1 | 2 | 2 |
| | | 3 | 0 | 3 | 0 | 3 | 0 | 3 | 3 | 3 | 1 | 3 | 1 | 3 | 1 | 3 | 1 | 3 | 2 |
| | | 4 | 0 | 4 | 0 | 4 | 0 | 4 | 3 | 4 | 3 | 4 | 0 | 4 | 1 | 4 | 1 | 4 | 2 |
| | | 5 | 0 | 5 | 0 | 5 | 0 | 5 | 3 | 5 | 3 | 5 | 3 | 5 | 0 | 5 | 1 | 5 | 2 |

FIG. 9A

| Measures | Algorithms | all dynamic channels | all static channels | fast channel control algorithms |
|---|---|---|---|---|
| Uniform Distribution | Average bandwidth-used amount of core network | 86.49185 Mbps | 165.8039 Mbps | 125.7360 Mbps |
| | Maximum average delay | 1.1770 sec | 0.2711 sec | 0.9392 sec |
| Zipf's Distribution | Average bandwidth-used amount of core network | 83.47796 Mbps | 165.8039 Mbps | 104.9931 Mbps |
| | Maximum average delay | 1.1330 sec | 0.2717 sec | 0.9172 sec |

METHOD FOR REDUCING CHANNEL CHANGE TIME OF INTERNET PROTOCOL TELEVISION (IPTV) AND IPTV SERVICE PROVISION SERVER FOR IMPLEMENTING THE SAME

CROSS-REFERENCE TO RELATED APPLICATION

This application claims the benefit of Korean Patent Application No. 10-2007-0057937, filed on Jun. 13, 2007, which is hereby incorporated by reference as if fully set forth herein.

BACKGROUND

1. Technical Field

The present invention relates to a method for providing an Internet Protocol Television (IPTV) service, and more particularly to a method for reducing channel change time of an IPTV, and an IPTV service provision server for implementing the same, which increase network efficiency and reduce a delay time occurring during channel change.

2. Background Art

Recently, with the increasing development of communication and Internet technologies, a Triple Play Service (TPS) for simultaneously transmitting broadcast data, telephonic data, and other data via a single subscriber line has been introduced in the market. The TPS provides users with a variety of services in a package. The number of users who desire to use the TPS rapidly increases and the number of service provision enterprises also rapidly increases.

A representative example of TPS services is an IPTV service. The IPTV service provides users with broadcast services over the Internet network. Compared with conventional broadcast services (e.g., cable-, satellite-, or terrestrial-broadcast services), it uses the network resources more effectively.

In more detail, as shown in FIG. 1A, the conventional broadcast services must transmit data of all channels to users irrespective of requests of the users, resulting in the occurrence of wasted bandwidth. As shown in FIG. 1B, the IP multicast technology has been introduced to the IPTV service, and the IPTV service can solve the bandwidth problem due to insufficient subscriber lines. According to the IPTV service, data only for the channel requested by a user can be transmitted, and network resources can be effectively used.

However, the IPTV technology still has disadvantages. For example, if a user requests a new channel, a delay time (hereinafter referred to as a channel change delay) occurs until the user-selected channel is outputted to the user terminal.

The channel change delay is generally classified into a command-processing delay, a network delay, a Settop-box (STB) jitter buffer delay, and a decoding delay.

The command-processing delay is indicative of a delay time from a first time at which the user who desires to change a current channel to another channel selects a corresponding channel using a remote-controller to a second time consumed until the STB transmits the channel request message over a network. The network delay is indicative of a delay time consumed until a first packet of the requested channel is received. The STB jitter buffer delay is indicative of an initial buffering delay time for removing added jitters from the network. The decoding delay is indicative of a delay time caused by the decoding process of compressed video data. The decoding delay unavoidably occurs since the video data cannot be decoded without using intraframe(s).

The channel change delay makes users unable to immediately receive a desired video data at a desired time, thereby reducing efficiency of the IPTV services.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made to overcome the above-described problems, and it is an object of the present invention to provide a method for reducing channel change time of an IPTV and an IPTV service provision server for implementing the same, which adjust the type of each of individual channels and the number of additional intraframes required to be inserted into video data to be transmitted via the individual channels so as to increase network efficiency and decrease channel change delay time.

It is another object of the invention to provide a method for reducing channel change time of an IPTV and an IPTV service provision server for implementing the same, which reflect channel preferences of users in determining the channel type and the number of additional intraframes.

It is yet another object of the invention to provide a method for reducing channel change time of an IPTV and an IPTV service provision server for implementing the same, which reduce calculation complexity when determining the channel type and the number of additional intraframes.

In one aspect, the present invention provides a method for reducing channel change time of an Internet Protocol Television (IPTV), which comprises: determining the types of individual channels to be provided to a user and the number of additional intraframes required to be inserted into video data to be provided via the channels; inserting the additional intraframes corresponding to the determined number into the video data; encoding the video data; and transmitting the encoded video data to a first router or a second router according to the determined channel type, before receiving a channel request signal from the user.

The channel type can be a first type or a second type. For the first type, the video data transmitted via the channel is transmitted to the first router. For the second type, the video data is transmitted to the second router. Preferably, the first router is a router adjacent to a user terminal and the second router is a router adjacent to an IPTV service provision server.

The channel type and the number of additional intraframes allow a channel change delay time to be equal to or less than a predetermined threshold value, and at the same time allow a total bandwidth of the channels required for providing the video data to be a minimum value.

Preferably, the step of determining the channel type and the number of intraframes may include: establishing a first status using the channel type and the number of intraframes as initial setup values; calculating a channel change delay time in the first status; if the channel change delay time in the first status is equal to or less than the threshold value, determining the channel type and the number of additional intraframes on the basis of the initial setup values of the first status; if the channel change delay time in the first status is higher than the threshold value, changing the initial setup values of the first status, and at the same time calculating channel change delay times of the changed setup values; and if there is a specific setup value for allowing the channel change delay time associated with the changed setup values to be equal to or less than the threshold value in the changed setup values, determining the channel type and the number of intraframes on the basis of a specific setup value for allowing the channel bandwidth to be a minimum value, and otherwise, if there is no specific setup value for allowing the channel change delay time to be equal to or less than the threshold value, updating the first status with a second status, wherein the channel change delay time calculating step to the status updating step are repeated until a specific status having a specific setup value for allowing the channel change delay time to be equal to or less than the threshold value is detected.

Also preferably, the updating from the first status with the second status is performed by determining a setup value, for allowing a cost value caused by modification of the setup value of the first status to be a maximum value, to be an initial setup value of the second status, so that the first status is updated with the second status.

The cost value is, preferably, calculated by the ratio of a variation amount between the channel change delay time associated with the setup value of the first status to a variation amount of the channel bandwidth.

In another aspect, the present invention provides a computer-readable recording medium storing a program for executing the above-described methods.

In still another aspect, the present invention provides an IPTV service provision server implementing the above methods. In a preferred embodiment, the server may comprise a calculator for determining the type of each of individual channels to be provided to a user and the number of additional intraframes required to be inserted into video data to be provided via the channels; an encoder for inserting the additional intraframes determined by the calculator into the video data and encoding the video data; and a data transmitter for transmitting the encoded video data to a first router adjacent to a user terminal or a second router adjacent to the IPTV service provision server according to the channel type determined by the calculator, before receiving a channel request signal from the user.

BRIEF DESCRIPTION OF THE DRAWINGS

The above objects, and other features and advantages of the present invention will become more apparent after reading the following detailed description when taken in conjunction with the drawings, in which:

FIG. 7 is a flow chart (algorithm) illustrating a method for determining the channel type and the number of additional intraframes according to a preferred embodiment of the present invention;

FIGS. 8A~8B show comparative performances of algorithms used for determining the channel type and the number of intraframes; and FIGS. 9A~9C show performances of the algorithm shown in FIG. 7.

DETAILED DESCRIPTION

Figure 1A:
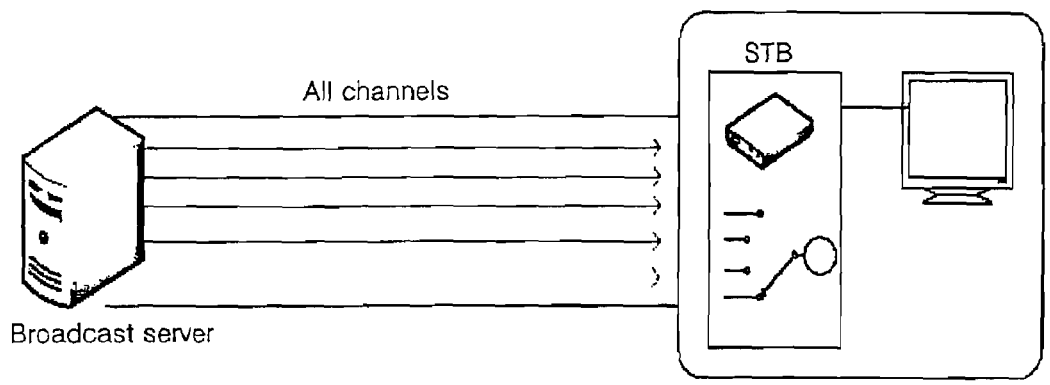
FIGS. 1A and 1B are diagrams illustrating a broadcast service provision mechanism and an IPTV service provision mechanism, respectively.
Figure 1B:
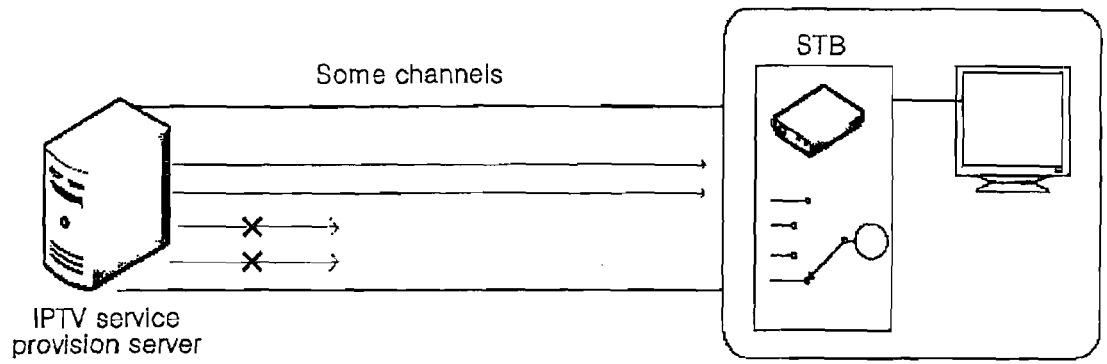

Now, preferred embodiments of the present invention will be described in detail with reference to the drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, for the convenience of description and better understanding of the present invention, network configuration of a typical IPTV service provision system and a channel change method used in the IPTV service provision system will hereinafter be described in detail.

Figure 2:
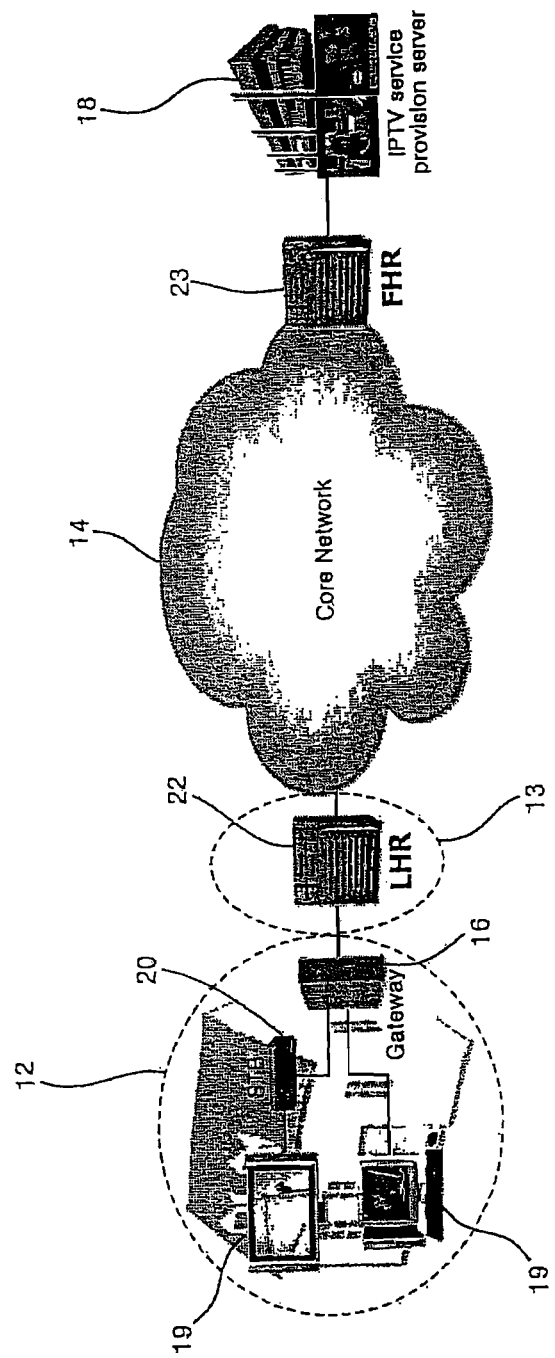
FIG. 2 shows network configuration of a typical IPTV service provision system.

As shown in FIG. 2, typically, an IPTV service provision system 10 includes a home network 12, an access network 13, a core network 14, and an IPTV service provision server 18 connected to the end of the core network 14.

The home network 12 includes a gateway 16, a user terminal 19, and a Set-top Box (STB) 20. The gateway 16, which connects the home network 12 to the access network 13, manages channels of the home network 12. The STB 20, which is connected to the user terminal 19 and the gateway 16, provides the user terminal 19 with IPTV services. The user terminal 19 displays the data transmitted with the IPTV services.

The access network 13 intermediates between the home network 12 and the core network 14. The access network 13 includes a last hoop router (LHR) 22 and at least one switching element (not shown). The LHR 22 indicates a specific router closest to the user terminal 19.

The core network 14 intermediates between LHR 22 and first hoop router (FHR) 23. The core network 14 includes at least one multicast router (not shown) which transmits broadcast data from the IPTV service provision server 18 to the user terminal 19. The FHR 23 indicates a specific router closet to the IPTV service provision server 18

The IPTV service provision server 18 acting as a head-end receives data of all channels from an external provider. To increase network efficiency, the IPTV service provision server 18 transmits broadcast channel data to users.

Figure 3:
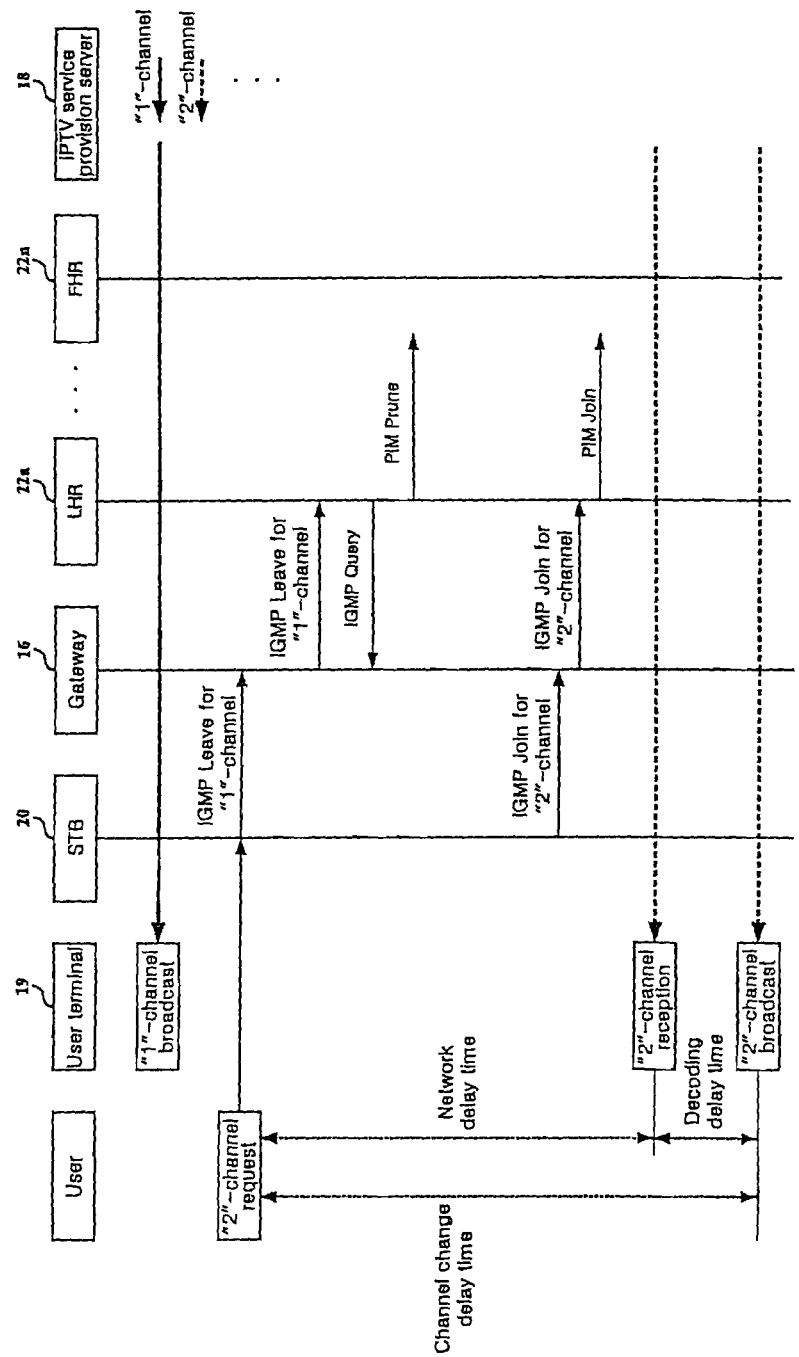
FIG. 3 is a diagram illustrating a channel change process of an IPTV.

The channel change method used in the IPTV provision system shown in FIG. 2 will hereinafter be described with reference to FIG. 3.

When a user who receives data of a channel denoted by "1" (hereinafter referred to as the "1"-channel) makes a request to change the current "1"-channel to another channel denoted by "2" (hereinafter referred to as the "2"-channel) using a remote-controller, the STB 20 transmits an Internet Group Management Protocol (IGMP) Leave message of the "1"-channel to the gateway 16, and the gateway 16 transmits the IGMP leave message to the LHR 22. In this case, the IGMP defines which one of multicast groups is focused by hosts of a single router within a subnet composed of the single router and several hosts. Thereafter, the LHR 22 receiving the IGMP leave message transmits the IGMP Group-Specific Query message to all the gateways (not shown) managed by the LHR 22 itself. If there is no response signal for a predetermined period of time, the LHR 22 transmits the PIM Prune message to an upper router, so that it secedes from the "1"-channel group.

In the meantime, if the STB 20 transmits the IGMP join message for the "2"-channel to the gateway 16 to join in the "2"-channel, the gateway 16 transmits the IGMP Join message to the LHR 22. If the LHR 22 receiving the IGMP Join message has previously received the "2"-channel data, it transmits the "2"-channel data to a corresponding gateway 13. Otherwise, if the LHR 22 has not previously received the "2"-channel data, the LHR 22 transmits the PIM Join message to an upper router, and at the same time attempts to join in the "2"-channel group. By the above-mentioned procedures, data of a channel requested by the user is received in the user terminal, and the received channel data is decoded, so that data of a corresponding channel is displayed for the user.

As described above, a network delay occurs in the channel change process since the Leave action for the old-channel group and the Join action for the new-channel group must be performed until the user receives the new-channel data. And, a decoding delay occurs in the decoding process of compressed video data after the corresponding channel data has been received in the user terminal.

A method for providing N users with the IPTV service composed of M channels will hereinafter be described.

Figure 4:
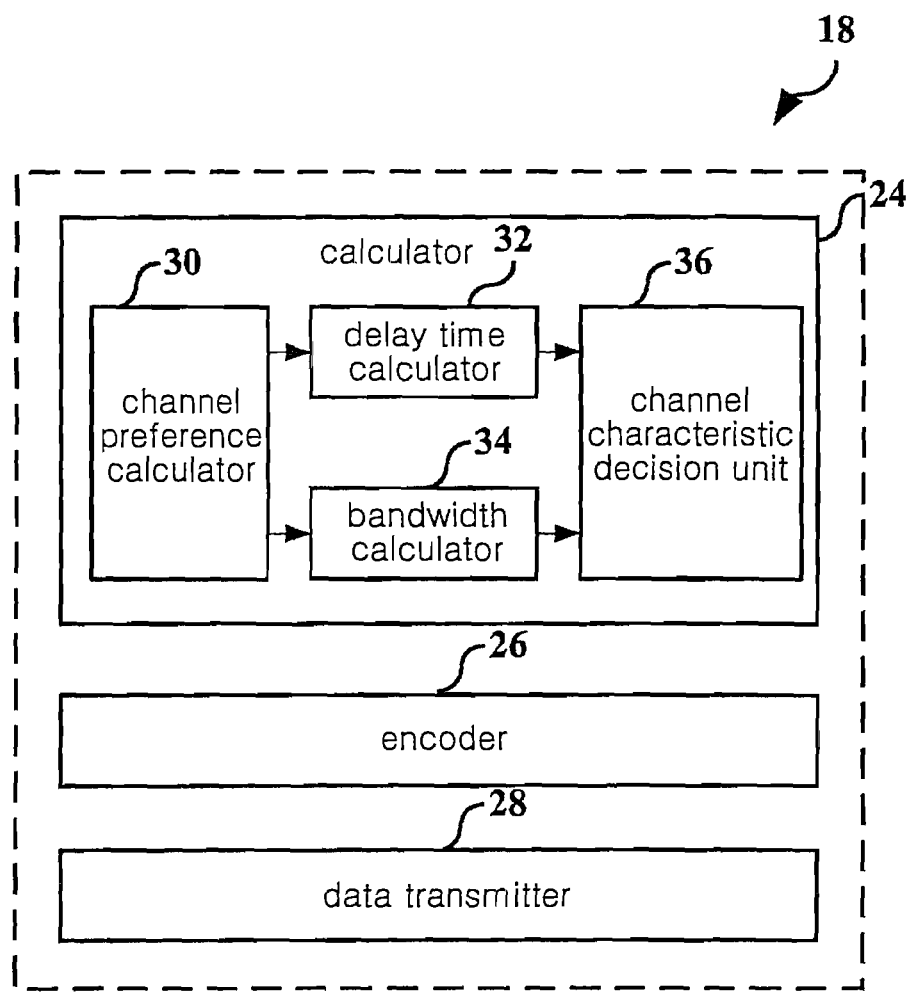
FIG. 4 is a block diagram illustrating an IPTV service provision server according to a preferred embodiment of the present invention.

FIG. 4 is a block diagram illustrating an IPTV service provision server according to a preferred embodiment of the present invention. Referring to FIG. 4, the IPTV service provision server 18 includes a calculator 24, an encoder 26, and a data transmitter 28.

The calculator 24 determines the type of each of individual channels and the number of additional intraframes required to be inserted into video data provided via the individual channels so as to minimize a channel bandwidth and a channel change delay.

In this case, the channel type determined by the calculator 24 is indicative of a first channel type (hereinafter referred to as a static channel) or a second channel type (hereinafter referred to as a dynamic channel). In the case of the static channel, channel data must be pre-transmitted to a router adjacent to the user terminal 19 before the user request occurs. In the case of the dynamic channel, channel data must be transmitted to the router adjacent to the IPTV service provision server 18 before the user request occurs.

The reason why the calculator 24 determines the types of individual channels and the number of additional intraframe(s) is to most effectively adjust the channel bandwidth and the channel delay.

More particularly, if a predetermined channel is determined to be a static channel, the network delay is relatively reduced, but the network bandwidth may be unnecessarily wasted when no user views data of a corresponding channel. Otherwise, if a predetermined channel is determined to be a dynamic channel, the network bandwidth can be effectively used, but the network delay unexpectedly increases when the user requests a corresponding channel.

Further, the calculator 24 determines the number of additional intraframes to effectively adjust the decoding delay of individual channels. That is, since there is no need to wait for the intraframes of the video data during the decoding process and the decoding process can be performed by additional intraframes, the decoding delay can be reduced. However, if the number of additional intraframes increases to reduce the decoding delay, the channel bandwidth increases, so that the calculator 24 determines the appropriate number of intraframes to adjust the channel bandwidth.

In the case of determining the channel type and the number of additional intraframes, the calculator 24 controls a channel change delay time to be equal to or less than a predetermined threshold value, and at the same time controls a total bandwidth of channels required for providing video data to be a minimum bandwidth. For this purpose, the calculator 24 includes a channel preference calculator 30, a delay time calculator 32, a bandwidth calculator 34, and a channel characteristic decision unit 36.

The channel preference calculator 30 calculates channel preferences of individual users, so that the channel preferences of the users can be reflected in the process of determining the channel type and the number of additional intraframes. A high user-preference channel is determined to be a static channel, and a low user-preference channel is determined to be a dynamic channel. If the number of additional intraframes increases in proportion to the user preference, the channel bandwidth and the channel delay can be more effectively reduced.

In this case, the channel preference of the i-th user may be represented by $\vec{p}_i$, and preferences of individual channels of the i-th user may be represented by $\vec{p}_i=(p_i^1, p_i^2, \ldots, p_i^M)$. The relationship between M channels and N users can be represented by the following Equation 1:

$$\sum_{j=1}^{M}\sum_{i=1}^{N} p_i^j = 1, \quad \sum_{j=1}^{M} p_i^j = \frac{1}{N} \qquad \text{[Equation 1]}$$

According to a preferred embodiment of the present invention, channel preferences of the users can be calculated by statistical data associated with channel-viewing states of the users. In more detail, the channel preference of each user can be estimated on the basis of a channel-viewing time of each user who has viewed a predetermined channel at intervals of a predetermined period of time. The estimation method can be represented by the following Equation 2:

$$p_i^j \approx \frac{t_i^j}{N \cdot T_{update}} \qquad \text{[Equation 2]}$$

In this case, $p_i^j$ is indicative of the preference of the i-th user of the j-th channel, $t_i^j$ is indicative of a j-th channel viewing time of the i-th user, and $T_{update}$ is indicative of a predetermined time interval, and N is indicative of the total number of users.

The delay time calculator 32 calculates a channel change delay time. In more detail, the delay time calculator 32 calculates the sum of a network delay time (i.e., a time consumed for reception of each channel) of each channel and a decoding time required for decoding video data provided via each channel, and multiplies the sum of the network delay time and the decoding time by the user preference of each channel, so that the channel change delay time can be calculated. If the above-mentioned method is extended to all the channels, the extended result can be represented by the following Equation 3:

$$(\vec{d}+\vec{d^I}) \cdot (N \cdot \vec{p}_i) \text{ for } 1 \leq i \leq N, \qquad \text{[Equation 3]}$$

In Equation 3, $\vec{d}$ is a vector indicating a network delay time associated with a channel, and is represented by $\vec{d}=(d_1, d_2, \ldots, d_M)$. $\vec{d^I}$ is a vector indicating the decoding delay time of video data in which the additional intraframes are inserted, and is represented by $\vec{d^I}=(d_1^I, d_2^I, \ldots, d_M^I)$. Therefore, as can be seen from Equation 3, the inner product between the channel preference values ($N \cdot \vec{p}_i$) of individual users and the sum of the network delay vector of the channel and the decoding delay vector is calculated, such that delay times of all channels of the individual users are calculated by Equation 3.

Here, $d_j$, indicative of a network delay time of the j-th channel, is represented by the following Equation 4, and $d_j^I$, indicative of a decoding delay time of the j-th channel, is represented by the following Equation 5:

$$d_j = \begin{cases} d_{static} : j\text{-th channel} = \text{static channel} \\ d_{dynamic} : j\text{-th channel} = \text{dynamic channel} \end{cases} \quad \text{[Equation 4]}$$

$$d_j^I = \frac{T_{gop}}{(n_j^I + 1)} \quad (0 \leq n_j^I \leq N_{ccs}^I, \text{ for } 1 \leq j \leq M) \quad \text{[Equation 5]}$$

In Equation 4, $d_{static}$ is an average network delay time of the static channel on the Internet, and $d_{dynamic}$ is an average network delay time of the dynamic channel. It should be noted that $d_{dynamic}$ is higher than $d_{static}$.

In Equation 5, $n_j^I$ is indicative of the number of additional intraframes inserted into a single GOP interval contained in video data transmitted via the j-th channel. In the case of representing the number of the additional intraframes to be inserted into the video data provided via individual channels in the form of a vector, this vector may be represented by $\vec{n} = (n_1^I, n_2^I, \ldots, n_M^I)$. In the meantime, $N_{ccs}^I$ is indicative of the maximum number of additional intraframes capable of being inserted into a single GOP interval, and $T_{gop}$ is indicative of the size of the single GOP.

The bandwidth calculator 34 calculates a total bandwidth of channels required for providing video data. The bandwidth calculator 34 multiplies a predetermined value indicating a channel type of each channel by the requested bandwidth for transmitting video data via a corresponding channel, so that it calculates a bandwidth of each channel. If the aforementioned method is extended to all the channels, the extended result can be represented by the following Equation 6:

$$(\vec{BW} + \vec{BW^I}) \cdot \vec{s} \quad \text{[Equation 6]}$$

In Equation 6, $\vec{BW}$ is a vector indicating a bandwidth of the requested channel during the transmission of video data, and is represented by $\vec{BW} = (BW_1, BW_2, \ldots, BW_M)$. $\vec{BW^I}$ is a vector indicating a bandwidth of the requested channel during the transmission of additional intraframes, and is represented by $\vec{BW^I} = (BW_1^I, BW_2^I, \ldots, BW_M^I)$. $\vec{s}$ is a vector indicating the type of each channel, and is represented by $\vec{s} = (s_1, s_2, \ldots, s_M)$.

As can be seen from Equation 6, the inner product between the bandwidth vector of each channel for transmitting video data in which the additional intraframes is inserted and the vector indicating the type of each channel is calculated, so that a bandwidth of all the channels required for transmitting the video data can also be calculated. In this case, $\vec{BW^I}$ is represented by the following Equation 7, and $\vec{s}$ is represented by the following Equation 8:

$$BW_j^I = \frac{n_j^I \cdot R_I}{T_{gop}} \quad \text{[Equation 7]}$$

$$s_j = \begin{cases} 1 : j\text{-th channel} = \text{static channel} \\ \sum_{i=1}^{N} p_i^j : j\text{-th channel} = \text{dynamic channel} \end{cases} \quad \text{[Equation 8]}$$

In Equation 7, $R_I$ is indicative of a fixed bit rate of the additional intraframes.

In other words, if the j-th channel is determined to be a static channel, the channel-type value is set to "1". If the j-th channel is determined to be a dynamic channel, the sum of preferences of individual users of the j-th channel is determined to be the channel-type value.

The channel characteristic decision unit 36 receives the channel change delay time calculated by the delay time calculator 32 and the channel bandwidth calculated by the bandwidth calculator 34, and determines the channel type of each channel and the number of additional intraframes using the received values.

In more detail, as shown in the following Equation 9, the channel characteristic decision unit 36 calculates $\vec{s} = (s_1, s_2, \ldots, s_M)$ and $\vec{n} = (n_1^I, n_2^I, \ldots, n_M^I)$ by which the channel change delay time calculated by Equation 3 is equal to or less than a predetermined threshold value $D_{MAX}$ and an overall channel bandwidth value calculated by Equation 6 is minimized, so that the channel types of all channels and the number of additional intraframes are determined by the calculated results $\vec{s} = (s_1, s_2, \ldots, s_M)$ and $\vec{n} = (n_1^I, n_2^I, \ldots, n_M^I)$.

$$(\vec{d} + \vec{d^I}) \cdot (N \cdot \vec{p}_i) \leq D_{MAX} \text{ for } 1 \leq i \leq N \quad \text{[Equation 9]}$$

According to a preferred embodiment of the present invention, the channel characteristic decision unit 36 can calculate $\vec{s} = (s_1, s_2, \ldots, s_M)$ and $\vec{n} = (n_1^I, n_2^I, \ldots, n_M^I)$ which satisfy both the resultant value of Equation 6 and Equation 9.

A detailed description of the channel characteristic decision unit 36 will hereinafter be described with reference to the trellis of FIG. 5.

Figure 5:
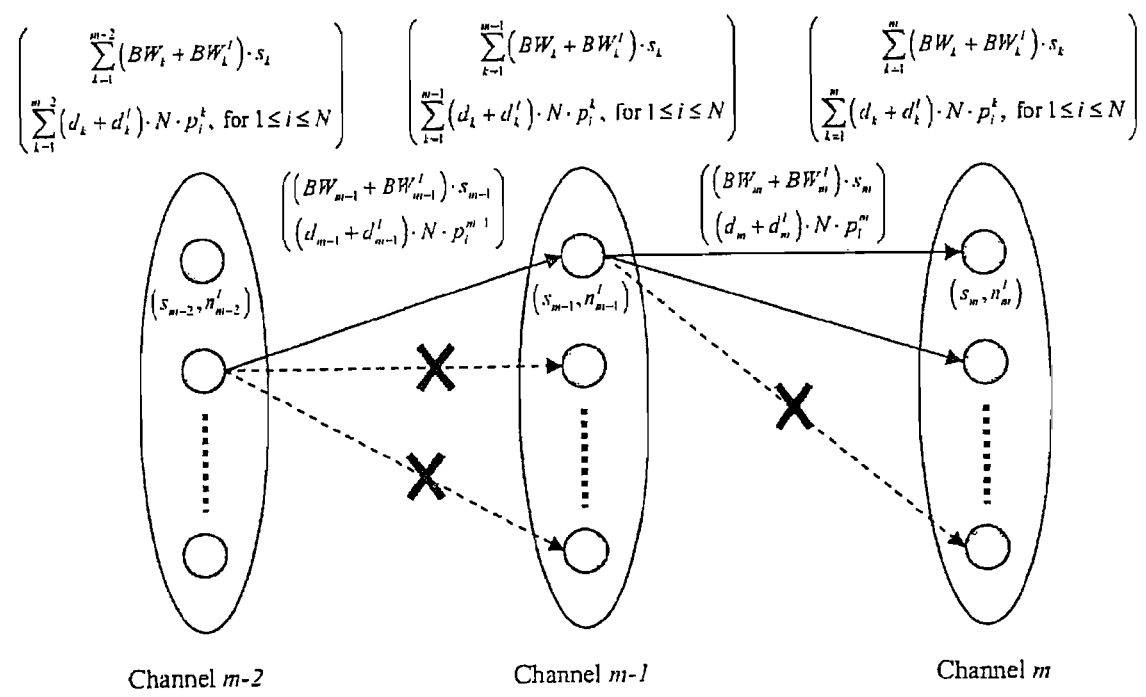
FIG. 5 shows the trellis of a Viterbi algorithm.

As shown in FIG. 5, each channel constructs a single domain, and each domain has $2*(N_{ccs}^I + 1)$ number of statuses (i.e., $2*(N_{ccs}^I + 1)$ statuses). Each status of the domain is indicative of the type of each channel and the number of additional intraframes, and the number of available combinations in the status combinations of each domain is denoted by $2*(N_{ccs}^I + 1)^M$. If the status combination is accumulated in the range from the beginning domain to the $(m-1)^{th}$ domain, the accumulated status combination is represented by the following Equation 10. If the status selected from the domain is denoted by $(s_m, n_m^I)$, the accumulated status combination on the $m^{th}$ domain is represented by the following Equation 11.

$$\left( \sum_{k=1}^{m-1} (BW_k + BW_k^I) \cdot s_k, \sum_{k=1}^{m-1} (d_k + d_k^I) \cdot N \cdot p_i^k \right) \quad \text{[Equation 10]}$$
for $1 \leq j \leq M$ $$\left( \sum_{k=1}^{m} (BW_k + BW_k^I) \cdot s_k, \sum_{k=1}^{m} (d_k + d_k^I) \cdot N \cdot p_i^k \right) \quad \text{[Equation 11]}$$
for $1 \leq j \leq M$ According to a preferred embodiment of the present invention, the Pruning technique is applied to the Trellis shown in FIG. 5 to reduce the search range for seeking an optimum solution. In more detail, in the case of determining the optimum transition from the $(m-1)^{th}$ domain to the $m^{th}$ domain, it is determined whether the status selected on the $m^{th}$ domain satisfies Equation 9. If the selected status on the $m^{th}$ domain is not satisfied, the transition unsatisfied with Equation 9 is deleted. The dotted lines of FIG. 5 indicate a specific domain status unsatisfied with Equation 9, so that this domain status indicates the transition to be deleted.

According to another embodiment of the present invention, the channel characteristic decision unit 36 can calculate $\vec{s}=(s_1, s_2, \ldots, s_M)$ and $\vec{n}=(n_1^I, n_2^I, \ldots, n_M^I)$ to reduce the number of calculations (i.e., the calculation complexity). It should be noted that $\vec{s}(s_1, s_2, \ldots, s_M)$ and $\vec{n}=(n_1^I, n_2^I, \ldots, n_M^I)$ satisfy Equation 9 while minimizing resultant value of Equation 6.

In more detail, the channel characteristic decision unit 36 sets the types of all channels to dynamic channels in an initial status, and sets the number of additional intraframe to "0". In other words, the initial status determines a bandwidth for transmitting video data to be a minimum bandwidth. Under this condition, the channel characteristic decision unit 36 calculates Delay_over$(\vec{s}, \vec{n})$ indicating how long the channel change delay time calculated by Equation 3 is higher than a threshold value. In this case, Delay_over$(\vec{s}, \vec{n})$ can be calculated by the following Equation 12:

$$\text{Delay\_over}(\vec{s}, \vec{n}) = \sum_{i=1}^{N} \text{MAX}\{0, (\vec{d}+\vec{d^I}) \cdot (N \cdot \vec{p_i}) - D_{MAX}\} \quad \text{[Equation 12]}$$

As shown in Equation 12, if the delay time is equal to or less than the threshold value, Delay_over$(\vec{s}, \vec{n})$ becomes zero "0". If the delay time is higher than the threshold value, Delay_over$(\vec{s}, \vec{n})$ becomes a positive (+) value.

If Delay_over$(\vec{s}, \vec{n})$ calculated in the initial status is "0", the channel characteristic decision unit 36 determines the channel type and the number of additional intraframes based on the setup value of the initial status.

Otherwise, if Delay_over$(\vec{s}, \vec{n})$ calculated in the initial status is not equal to "0", the channel characteristic decision unit 36 changes the types of individual channels or the number of additional intraframes in the initial status, calculates Delay_over$(\vec{s}, \vec{n})$, and determines the presence or absence of the setup value for allowing Delay_over$(\vec{s}, \vec{n})$ to be "0".

If the setup value for allowing Delay_over$(\vec{s}, \vec{n})$ to be "0" exists, the channel characteristic decision unit 36 determines the channel type and the number of additional intraframes on the basis of a specific setup value for allowing the channel bandwidth to be a minimum value. If there is no setup value for allowing Delay_over$(\vec{s}, \vec{n})$ to be "0", the channel characteristic decision unit 36 calculates a cost value caused by the modification of the initial setup value, and updates the initial status using the cost value, so that it determines the next status. In this case, the cost value may be calculated by the following Equation 13:

$$\text{Cost}(\vec{s}, \vec{n}) = \Delta\text{Delay\_over}(\vec{s}, \vec{n}) / \Delta BW(\vec{s}, \vec{n}) \quad \text{[Equation 13]}$$

$$\text{for } 0 \le n_j^I \le N_{ccs}^I \text{ and } s_j = \sum_{i=1}^{N} p_i^j \text{ or } 1$$

The initial status is updated by a specific setup value at which the maximum cost value is acquired.

The channel characteristic decision unit 36 repeats the above-mentioned processes until a desired status in which Delay_over$(\vec{s}, \vec{n})$ becomes zero is detected, so that it determines the channel type and the number of additional intraframes.

In Equation 13, $\Delta$Delay_over$(\vec{s}, \vec{n})$ is indicative of the decrement of the value Delay_over$(\vec{s}, \vec{n})$, and $\Delta BW(\vec{s}, \vec{n})$ is indicative of the increment of a bandwidth caused by the status change.

Referring back to FIG. 4, the encoder 26 inserts additional intraframes determined by the calculator 24 into video data, and encodes the video data. According to a preferred embodiment of the present invention, the video data is encoded into the "IBBPBBPBBPBB" structure at 30 fps (Frames Per Second).

The data transmitter 28 transmits the video data encoded by the encoder 26. If the type of a predetermined channel is determined to be a static channel, the data transmitter 28 transmits the video data encoded by the encoder 26 to the router adjacent to the user terminal 19 before the user request occurs. If the type of a predetermined channel is determined to be a dynamic channel, the data transmitter 28 transmits the video data encoded by the encoder 26 to another router adjacent to the IPTV service provision server 18 before the user request occurs.

A preferred method for reducing channel change time of the IPTV using an IPTV service provision server will hereinafter be described with reference to FIG. 6.

Figure 6:
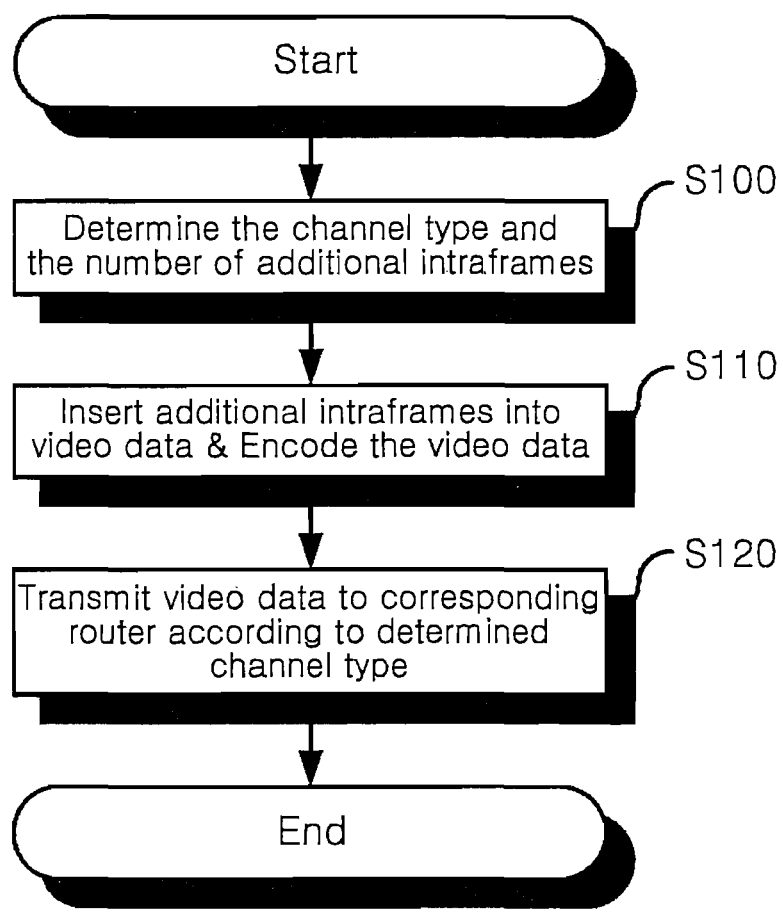
FIG. 6 is a flow chart illustrating a method for reducing a channel change time of an IPTV according to the one embodiment of the present invention.

Referring to FIG. 6, the IPTV service provision server determines the types of individual channels to be provided to a user and the number of additional intraframes required to be inserted into video data at step 100. In this case, the channel type is determined to be either a static channel for transmitting video data to a first router adjacent to the user terminal 19 before the user enters a channel request signal, or a dynamic channel for transmitting video data to a second router adjacent to the IPTV service provision server 18 before the user enters a channel request signal. In the case of determining the channel type and the number of additional intraframes to be inserted into individual channels according to the present invention, it is preferable that the types of the individual channels may be determined by referring to channel preferences of the user.

In this case, the above-mentioned channel type and the number of additional intraframes must allow the channel change delay time to be equal to or less than a predetermined threshold value, and at the same time must allow a total bandwidth of channels required for providing the video data to be a minimum bandwidth.

In this case, the channel change delay time is calculated by Equation 3, and the bandwidth of channels is calculated by Equation 6. Since this calculation process has already been disclosed in Equations 3 and 6, a detailed description thereof will herein be omitted for the convenience of description.

According to a preferred embodiment of the present invention, in order to determine the channel type and the number of additional intraframes using the channel change delay time calculated by Equation 3 and the channel bandwidth calculated by Equation 6, the present invention may use the Viterbi algorithm. The Viterbi algorithm deletes transitions unsatisfied with Equation 9 from a plurality of transitions from a previous status to a current status using the Trellis shown in FIG. 5.

According to another embodiment of the present invention, the present invention can calculate the optimum channel type and the number of additional intraframes using the algorithm shown in FIG. 7.

Referring to FIG. 7, individual channels are set to the initial status at step S200. In this case, the initial status indicates that the channel type is a dynamic channel and the number of additional intraframes is "0". Thereafter, the channel type and the number of additional intraframes are considered to be a status setup value.

Next, Delay_over($\vec{s}, \vec{n}$) in the initial status is calculated by Equation 12 at step 210. It is determined whether Delay_over($\vec{s}, \vec{n}$) is "0" at step S220. If it is determined Delay_over($\vec{s}, \vec{n}$) is "0", the channel type and the number of additional intraframes are determined on the basis of the initial status setup value at step 230.

If Delay_over($\vec{s}, \vec{n}$) is not equal to "0" at step 220, Delay_over($\vec{s}, \vec{n}$) is calculated while the initial status setup value is changed at step S235. Thereafter, it is determined whether specific setup value capable of allowing the calculated Delay_over($\vec{s}, \vec{n}$) value to be "0" exists at step S240. If the specific setup value for allowing the value Delay_over($\vec{s}, \vec{n}$) to be "0" exists, the channel type and the number of additional intraframes is determined on the basis of a specific setup value for allowing the channel bandwidth to be a minimum value at step 250.

If there is no setup value for allowing Delay_over($\vec{s}, \vec{n}$) to be "0" at step 240, a cost value caused by the modification of the initial setup value is determined at step 260 and the initial status is updated using the setup value for allowing the calculated cost value to be a maximum to be determined the next status at step 270. In this case, the cost value is calculated by Equation 13. The calculation process of the cost value has already been disclosed in Equation 13, so that a detailed description thereof will herein be omitted for the convenience of description.

Thereafter, the above-mentioned steps 235~270 are repeated until a desired status in which Delay_over($\vec{s}, \vec{n}$) becomes zero is detected, so that the channel type and the number of additional intraframes are determined.

Referring back to FIG. 6, additional intraframes determined at step 100 are inserted into a video data, and the video data is encoded at step 100. If the channel type is determined to be a static channel at step 100, the encoded video data is transmitted to the router adjacent to the user terminal 19 before the user request occurs. If the channel type is determined to be a dynamic channel, the encoded video data is transmitted to another router closest to the IPTV service provision server 18 before the user request occurs at step 120.

Figure 8B:
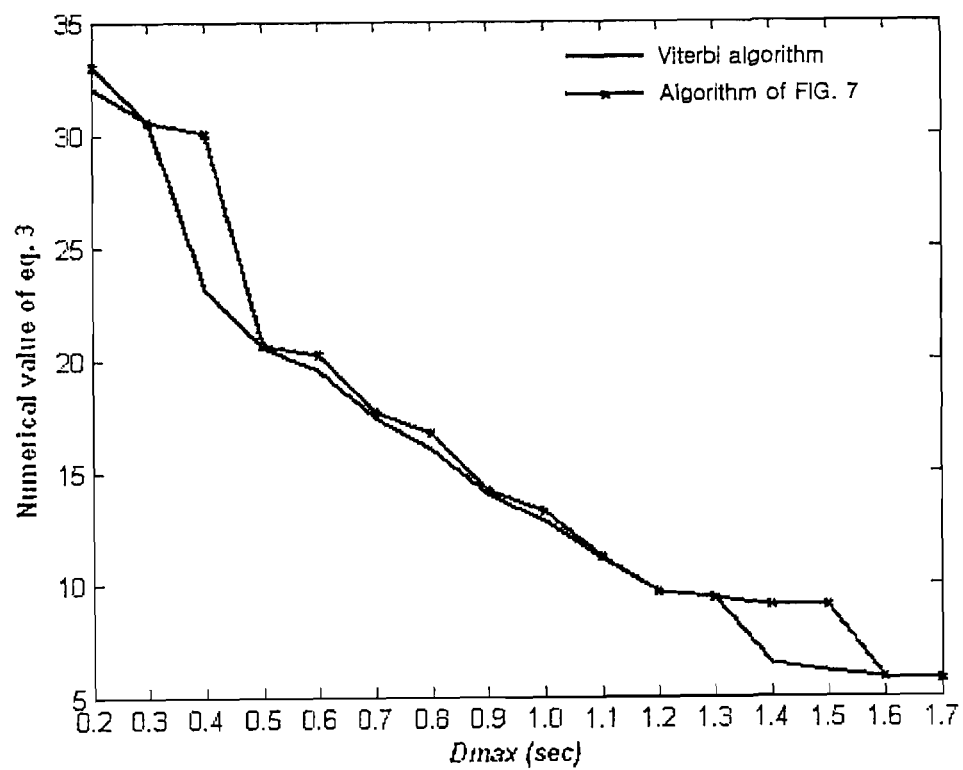

FIGS. 8A and 8B show comparative performances of two algorithms used for determining the channel type and the number of intraframes according to preferred embodiments of the present invention.

Preconditions for the experiment will be briefly described. It should be noted that the experimental environment is implemented by the OPNET, and a delay time caused by the channel change and the bandwidth-used amount of the core network are used as a measure of the comparison between two algorithms. A link bandwidth of the core network is set to 1 Gbps, and a link bandwidth of the access network is set to 100 Mbps. The unidirectional delay time on the IP network is 0.6 sec, the number of users in an access network is set to 20, video data provided via each channel is encoded with at 30 fps (Frames Per Second), and the encoding structure is "IBBPBBPBBPBB".

The channels are classified into an SDTV channel group and an HDTV channel group. The bandwidth of the SDTV channel group is 4.12 Mbps, and the bandwidth of the HDTV channel group is 12.06 Mbps. The size of additional intraframes to be inserted into video data is 25000 bytes, and the maximum number of additional intraframes to be inserted into a single GOP is set to "3". The time interval between channel requests of individual users follows the Poisson distribution. A request rate λ is set to 1/30 (Number of Requests Per Second). The channel preferences of individual users follow the Uniform distribution or the Zipf's distribution. In the case of the Zipf's distribution, the skew factor θ is set to "1.0". Generally, the preference of the HDTV channel is determined to be slightly higher than the preference of the SDTV channel. Although individual users have the same channel preference tendency, the channel numbers of the users may be different from each other.

According to the Viterbi algorithm, as the number of channels increases, the calculation complexity exponentially increases. For a simplified experiment, it is assumed that the user's channel preference follows the Uniform distribution, and a relatively small number of channels are used for the experiment. In this experiment, it is assumed that the "1"-channel is the HDTV channel, and other channels from the "2"-channel to the "5" channel are the SDTV channels.

As shown in FIGS. 8a~8B, it can be recognized that the Viterbi algorithm and the algorithm of FIG. 7 increase the number of static channels and the number of additional intraframes in inverse proportion to the threshold value so as to satisfy Equation 9. Although there is a little difference between performances of the two algorithms at different threshold values (0.4, 1.4, and 1.5), it can be recognized that the performances of the two algorithms are generally similar to each other. The CPU time of the algorithm shown in FIG. 7 is 0.062 sec, and is less than the CPU time 0.109 sec of the Viterbi algorithm, so that it can be recognized that the calculation complexity of the algorithm of FIG. 7 is superior to that of the Viterbi algorithm.

Figure 9B:
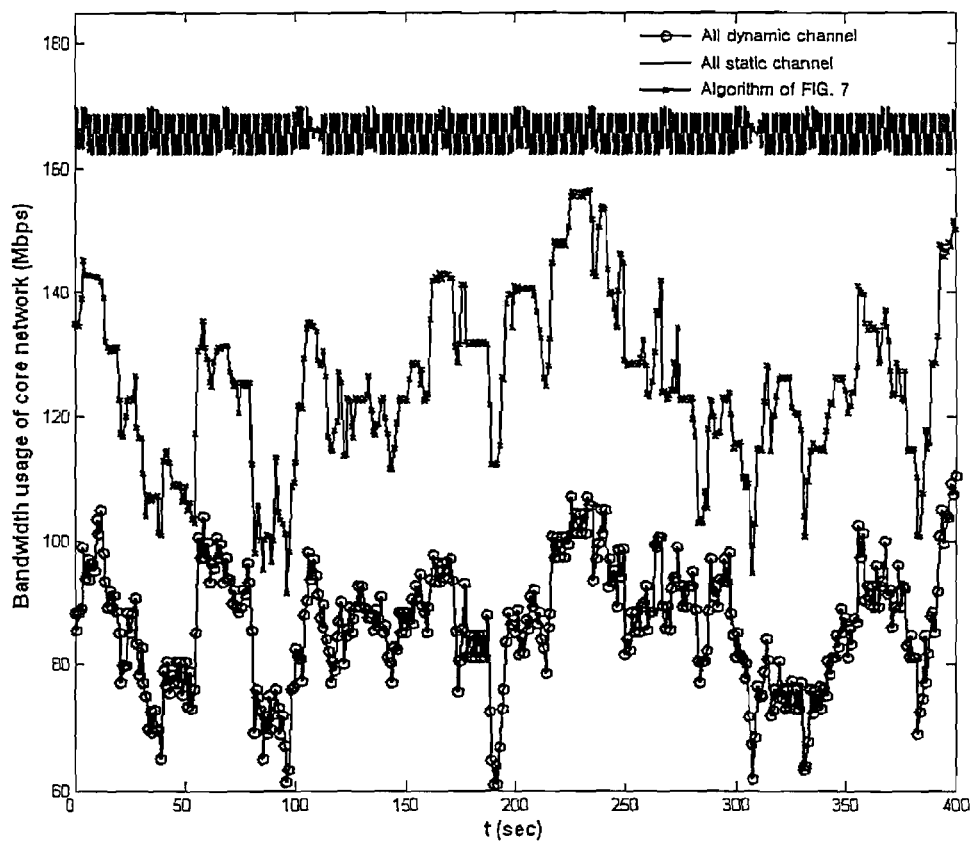
Figure 9C:
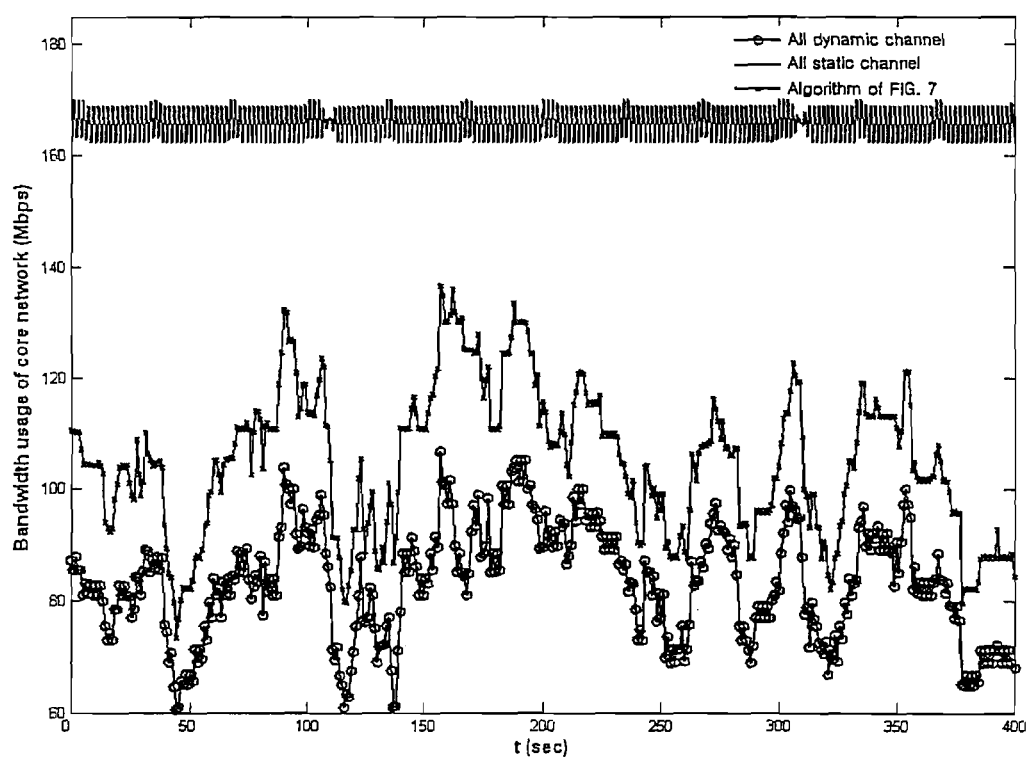

FIGS. 9A~9C show performances of the algorithm of FIG. 7 according to an embodiment of the present invention.

To perform the experiment for the performances of the algorithm of FIG. 7, it is assumed that the "1"-channel, the "5"-channel, the "10"-channel, the "20"-channel, and the "30"-channel from among all the channels are set to the HDTV channels, the remaining channels other than the above-mentioned channels are set to the SDTV channels, the channel preferences of individual users follow the Uniform or Zipf's distribution, and the threshold value is set to 1.0 sec.

Provided that the user's channel preference follows the Uniform distribution, and all the channels are set to dynamic channels, the best network efficiency is implemented as shown in FIGS. 9A~9B, although there can an unexpected user whose channel change delay exceeds the threshold value in this dynamic channel status. Provided that the user's channel preference follows the Uniform distribution, and all the channels are set to static channels, the network efficiency is reduced whereas the channel change delay has the best performance, as shown in FIGS. 9A~9B.

In the case of the algorithm of FIG. 7, the channel type is determined on the basis of the channel preferences of individual users, and the additional intraframes are inserted into video data to be transmitted via individual channels, so that it can be recognized that the network efficiency increases and the user's channel change delay may drop to the threshold value or less.

In the meantime, if the user's channel preference follows the Zipf's distribution, the result similar to the above-mentioned result is acquired. As shown in FIG. 9C, the algorithm of FIG. 7 delays the channel change delay and increases the network efficiency.

According to the preferred embodiments of the present invention, as discussed above, the type of each individual channel and the number of additional intraframes can be adjusted so as to increase network efficiency and decrease channel change delay time.

Also, user preferences of the individual channels are used to determine the channel type and the number of additional intraframes so that a high user-preference channel is pre-transmitted to a router adjacent to the user terminal, many intraframes are inserted into video data of the high user-preference channel, thereby minimizing channel change delay.

Further, a new algorithm is applied for determining the channel type and the number of additional intraframes, thereby reducing calculation complexity.

Although the embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for reducing channel change time of an Internet Protocol Television (IPTV) comprising:
   encoding by and encoder video data with predetermined the number of additional intraframes inserted thereinto; and
   transmitting by a data transmitter the encoded video data to a first router or a second router according to predetermined channel type, before receiving a channel request signal from the user,
   wherein the number of additional intraframes and the channel type allow a channel change delay time to be equal to or less than a predetermined threshold value and allow a total bandwidth of the channels required for providing the video data to be a minimum value,
   wherein the channel change delay time is calculated by multiplying the sum of time consumed for reception of the individual channels and decoding delay time of the video data provided via the individual channels by a user preferences of the individual channels.

2. The method according to claim 1, wherein the user preferences of the individual channels are estimated on the basis of a channel-viewing time of the user who has viewed a predetermined channel at intervals of a predetermined period of time.

3. The method according to claim 1, wherein the channel type is classified into a first type in which the video data is transmitted to the first router adjacent to a user terminal, and a second type in which the video data is transmitted to the second router adjacent to an IPTV service provision server.

4. The method according to claim 1, wherein the bandwidth of the channels is calculated by multiplying a predetermined value indicating the channel type by the bandwidth of each channel required for providing the video data.

5. The method according to claim 4, wherein:
   if a predetermined channel is a first type, the predetermined value indicating the channel type is determined to be a first value, and
   if a predetermined channel is a second type, the predetermined value indicating the channel type is determined to be the sum of the user preferences of the predetermined channel.

6. The method according to claim 1, wherein the channel type and the number of intraframes are determined by the Viterbi algorithm.

7. The method according to claim 1, further comprising determining the channel type and the number of intraframes, wherein the step of determining the channel type and the number of intraframes includes:
   establishing a first status using the channel type and the number of intraframes as initial setup values;
   calculating the channel change delay time in the first status;
   if the channel change delay time in the first status is equal to or less than the threshold value, determining the channel type and the number of additional intraframes on the basis of the initial setup values of the first status;
   if the channel change delay time in the first status is higher than the threshold value, changing the initial setup values of the first status and calculating channel change delay times of the changed setup values; and
   if there is a specific setup value for allowing the channel change delay time associated with the changed setup values to be equal to or less than the threshold value in the changed setup values, determining the channel type and the number of intraframes on the basis of a specific setup value for allowing the channel bandwidth to be a minimum value, and otherwise, if there is no specific setup value for allowing the channel change delay time to be equal to or less than the threshold value, updating the first status with a second status,
   wherein the channel change delay time calculating step to the status updating step are repeated until a specific status having a specific setup value for allowing the channel change delay time to be equal to or less than the threshold value is detected.

8. The method according to claim 7, wherein the updating from the first status with the second status is performed by determining a setup value, for allowing a cost value caused by modification of the setup value of the first status to be a maximum value to be an initial setup value of the second status, so that the first status is updated with the second status.

9. The method according to claim 8, wherein the cost value is calculated by the ratio of a variation amount in differences between the channel change delay time associated with the setup value of the first status and the threshold value to a variation amount of the channel bandwidth.

10. The method according to claim 7, wherein the initial setup value of the first status indicates that the channel type of all channels is set to the second type and the number of additional intraframes is zero "0".

11. The method according to claim 1, wherein the channel type and the number of additional intraframes are determined on the basis of the user preferences of the individual channels.

12. An Internet Protocol Television (IPTV) service provision server comprising:
   an encoder for inserting predetermined the number of additional intraframes into the video data, and encoding the video data; and
   a data transmitter for transmitting the encoded video data to a first router adjacent to a user terminal or a second router adjacent to the IPTV service provision server according to predetermined channel type, before receiving a channel request signal from the user,
   wherein the channel type and the number of additional intraframes allow a channel change delay time to be equal to or less than a predetermined threshold value and allow a total bandwidth of the channels required for providing the video data to be a minimum value, wherein the channel change delay time is calculated by multiplying the sum of a specific time consumed for reception of the individual channels and a decoding delay time of the video data provided via the individual channels by a user preferences of the individual channels.

13. The IPTV service provision server according to claim 12, wherein the channel type determined is classified into a first type in which the video data is transmitted to the first router via the channel and a second type in which the video data is transmitted to the second router via the channel.

14. The IPTV service provision server according to claim 12, further comprising a calculator for determining the channel type and the number of additional intraframes, wherein the calculator includes:

a channel preference calculator for calculating the user preference of a predetermined channel; a delay time calculator for calculating the channel change delay time;

a bandwidth calculator for multiplying a predetermined value indicating the channel type by the bandwidth of each channel required for providing the video data to calculate a total bandwidth of the channels; and a channel characteristic decision unit for determining the channel type and the number of additional intraframes, so that the channel change delay time is adjusted to be equal to or less than the threshold value and the total bandwidth of channels is adjusted to be a minimum bandwidth.

15. The IPTV service provision server according to claim 14, wherein the calculator establishes a first status using the channel type and the number of intraframes as setup values, changes the setup values until a specific status having a specific setup value for allowing the channel change delay time to be equal to or less than the threshold value is detected, and repeatedly updates the first status, and if the specific status having the specific setup value for allowing the channel change delay time to be equal to or less than the threshold value is detected, the calculator determines the channel type and the number of additional intraframes on the basis of a specific setup value, for allowing the channel bandwidth to be a minimum value, from among corresponding-status setup values.

16. The IPTV service provision server according to claim 15, wherein the repeated updating of the first status is performed when there is no setup value for allowing the channel change delay time to be equal to or less than the threshold value in changed setup values of the first status.

17. The IPTV service provision server according to claim 16, wherein the repeated updating from the first status to the second status is performed using a specific setup value for allowing a cost value caused by modification of the first-status setup value to be a maximum value, so that the first status is updated with the second status.

18. The IPTV service provision server according to claim 17, wherein the cost value is calculated by the ratio of a variation amount in differences between the channel change delay time associated with the setup value of the first status and the threshold value to a variation amount of the channel bandwidth.

19. The IPTV service provision server according to claim 15, wherein the initial setup value of the first status indicates that the channel type of all channels is set to the second type and the number of additional intraframes is zero "0".

* * * * *